US00RE38304E

(19) United States
(12) Reissued Patent
Bergmans et al.

(10) Patent Number: US RE38,304 E
(45) Date of Reissued Patent: Nov. 11, 2003

(54) METHOD OF PRINTING IMAGE INFORMATION HAVING A SPECIFIC ORIENTATION

(75) Inventors: Jacques J. H. Bergmans, Grubbenvorst (NL); Gerardus G. J. C. Kessels, Venlo (NL); Theodrikus H. I. E. van Gasteren, Sevenum (NL); Eduardus J. W. van Vliembergen, Venlo (NL); Antonius H. J. G. Lommen, Grubbenvorst (NL)

(73) Assignee: Oce-Technologies B.V., Venlo (NL)

(21) Appl. No.: 09/983,589

(22) Filed: Oct. 25, 2001

Related U.S. Patent Documents

Reissue of:
(64) Patent No.: 5,973,721
Issued: Oct. 26, 1999
Appl. No.: 08/821,854
Filed: Mar. 21, 1997

(30) Foreign Application Priority Data

Mar. 21, 1996 (NL) ..... 1002675

(51) Int. Cl.[7] ..... B41J 2/435; H04N 1/21; G03G 15/00

(52) U.S. Cl. ..... 347/262; 347/264; 358/296; 358/1.9; 399/368; 399/383

(58) Field of Search ..... 347/234, 262, 347/264, 248, 155, 251; 358/537, 452, 444, 448, 296, 443, 445; 382/296, 297, 298; 399/362, 388, 408, 363, 365, 368, 383, 391, 6, 17

(56) References Cited

U.S. PATENT DOCUMENTS

| | | | | | |
|---|---|---|---|---|---|
| 4,763,167 | A | * | 8/1988 | Watanabe et al. | 347/155 |
| 5,105,230 | A | * | 4/1992 | Emori | 399/391 |
| 5,151,976 | A | * | 9/1992 | Artieri | 345/516 |
| 5,343,304 | A | * | 8/1994 | Nakai et al. | 358/296 |
| 5,359,694 | A | * | 10/1994 | Concordel | 358/445 |
| 5,481,354 | A | * | 1/1996 | Nakajima | 399/371 |
| 5,600,429 | A | * | 2/1997 | Kutsuwada | 399/17 |
| 5,760,912 | A | * | 6/1998 | Itoh | 358/296 |

FOREIGN PATENT DOCUMENTS

EP 0628922 * 12/1994 ..... G06F/15/64

* cited by examiner

*Primary Examiner*—Hai Pham
(74) *Attorney, Agent, or Firm*—Birch, Stewart, Kolasch & Birch, LLP

(57) ABSTRACT

A method of printing image information on a receiving material, two sides of which are provided with a binding portion for collecting a plurality of receiving materials into a booklet, the image information of at least two images being printed next to one another on the receiving material such that the images situated next to one another are printed with reading orientations rotated 180° relative to one another and forming a right angle with the sides of the receiving material that are provided with the binding portion. To rotate the images, a fast method of rotating digital images is described which requires minimal memory space. Furthermore, the rotation method is particularly applicable to rotating a series of images and includes the capability of rotating each image in the series differently while utilizing minimal memory space and processor time.

16 Claims, 5 Drawing Sheets

Fig. 4(a)

| | | | |
|---|---|---|---|
| 0 | 1 | 2 | 3 |
| 4 | 5 | 6 | 7 |
| 8 | 9 | 10 | 11 |
| 12 | 13 | 14 | 15 |
| 16 | 17 | 18 | 19 |
| 20 | 21 | 22 | 23 |

Fig. 4(b)

| | | | |
|---|---|---|---|
| A | B | C | D |
| E | F | G | H |
| I | J | K | L |
| M | N | O | P |
| Q | R | S | T |
| U | V | W | X |

Fig. 4(c)

| | | | |
|---|---|---|---|
| A | B | C | D |
| E | F | G | H |
| I | J | K | L |
| M | N | O | P |
| Q | R | S | T |
| U | V | W | X |

Fig. 4(d)

| | | | | | |
|---|---|---|---|---|---|
| U | Q | M | I | E | A |
| V | R | N | J | F | B |
| W | S | O | K | G | C |
| X | T | P | L | H | D |

Fig. 4(e)

| | | | |
|---|---|---|---|
| a | b | c | d |
| e | f | g | h |
| i | j | k | l |
| m | n | o | p |
| q | r | s | t |
| u | v | w | x |

Fig. 4(f)

| | | | |
|---|---|---|---|
| f | l | r | x |
| e | k | q | w |
| d | j | p | v |
| c | i | o | u |
| b | h | n | t |
| a | g | m | s |

Fig. 4(g)

| | | | | | |
|---|---|---|---|---|---|
| u | q | m | i | e | a |
| v | r | n | j | f | b |
| w | s | o | k | g | c |
| x | t | p | l | h | d |

Fig. 4(h)

| | | | |
|---|---|---|---|
| *A* | *B* | *C* | *D* |
| *E* | *F* | *G* | *H* |
| *I* | *J* | *K* | *L* |
| *M* | *N* | *O* | *P* |
| *Q* | *R* | *S* | *T* |
| *U* | *V* | *W* | *X* |

Fig. 4(i)

| | | | |
|---|---|---|---|
| *K* | *V* | *H* | *S* |
| *E* | *P* | *B* | *M* |
| *X* | *J* | *U* | *G* |
| *R* | *D* | *O* | *A* |
| *L* | *W* | *I* | *T* |
| *F* | *Q* | *C* | *N* |

Fig. 4(j)

| | | | | | |
|---|---|---|---|---|---|
| *U* | *Q* | *M* | *I* | *E* | *A* |
| *V* | *R* | *N* | *J* | *F* | *B* |
| *W* | *S* | *O* | *K* | *G* | *C* |
| *X* | *T* | *P* | *L* | *H* | *D* |

*+90° Rotation*

*Fig. 5(a)*

| | | | |
|---|---|---|---|
| 0 | 1 | 2 | 3 |
| 4 | 5 | 6 | 7 |
| 8 | 9 | 10 | 11 |
| 12 | 13 | 14 | 15 |
| 16 | 17 | 18 | 19 |
| 20 | 21 | 22 | 23 |

*Fig. 5(b)*

| | | | |
|---|---|---|---|
| A | B | C | D |
| E | F | G | H |
| I | J | K | L |
| M | N | O | P |
| Q | R | S | T |
| U | V | W | X |

*Fig. 5(c)*

| | | | |
|---|---|---|---|
| A | B | C | D |
| E | F | G | H |
| I | J | K | L |
| M | N | O | P |
| Q | R | S | T |
| U | V | W | X |

*Fig. 5(d)*

| | | | | | |
|---|---|---|---|---|---|
| D | H | L | P | T | X |
| C | G | K | O | S | W |
| B | F | J | N | R | V |
| A | E | I | M | Q | U |

*Fig. 5(e)*

| | | | |
|---|---|---|---|
| a | b | c | d |
| e | f | g | h |
| i | j | k | l |
| m | n | o | p |
| q | r | s | t |
| u | v | w | x |

*Fig. 5(f)*

| | | | |
|---|---|---|---|
| s | m | g | a |
| t | n | h | b |
| u | o | i | c |
| v | p | j | d |
| w | q | k | e |
| x | r | l | f |

*Fig. 5(g)*

| | | | | | |
|---|---|---|---|---|---|
| d | h | l | p | t | x |
| c | g | k | o | s | w |
| b | f | j | n | r | v |
| a | e | i | m | q | u |

*Fig. 5(h)*

| | | | |
|---|---|---|---|
| A | B | C | D |
| E | F | G | H |
| I | J | K | L |
| M | N | O | P |
| Q | R | S | T |
| U | V | W | X |

*Fig. 5(i)*

| | | | |
|---|---|---|---|
| K | V | H | S |
| E | P | B | M |
| X | J | U | G |
| R | D | O | A |
| L | W | I | T |
| F | Q | C | N |

*Fig. 5(j)*

| | | | | | |
|---|---|---|---|---|---|
| D | H | L | R | T | X |
| C | G | K | O | S | W |
| B | F | J | N | R | V |
| A | E | I | M | Q | U |

*-90° Rotation*

Fig. 6(a)

| | | | |
|---|---|---|---|
| 0 | 1 | 2 | 3 |
| 4 | 5 | 6 | 7 |
| 8 | 9 | 10 | 11 |
| 12 | 13 | 14 | 15 |
| 16 | 17 | 18 | 19 |
| 20 | 21 | 22 | 23 |

Fig. 6(b)

| | | | |
|---|---|---|---|
| A | B | C | D |
| E | F | G | H |
| I | J | K | L |
| M | N | O | P |
| Q | R | S | T |
| U | V | W | X |

Fig. 6(c)

| | | | |
|---|---|---|---|
| A | B | C | D |
| E | F | G | H |
| I | J | K | L |
| M | N | O | P |
| Q | R | S | T |
| U | V | W | X |

Fig. 6(d)

| | | | |
|---|---|---|---|
| X | W | V | U |
| T | S | R | Q |
| P | O | N | M |
| L | K | J | I |
| H | G | F | E |
| D | C | B | A |

Fig. 6(e)

| | | | |
|---|---|---|---|
| a | b | c | d |
| e | f | g | h |
| i | j | k | l |
| m | n | o | p |
| q | r | s | t |
| u | v | w | x |

Fig. 6(f)

| | | | |
|---|---|---|---|
| x | w | v | u |
| t | s | r | q |
| p | o | n | m |
| l | k | j | i |
| h | g | f | e |
| d | c | b | a |

Fig. 6(g)

| | | | |
|---|---|---|---|
| x | w | v | u |
| t | s | r | q |
| p | o | n | m |
| l | k | j | i |
| h | g | f | e |
| d | c | b | a |

Fig. 6(h)

| | | | |
|---|---|---|---|
| *A* | *B* | *C* | *D* |
| *E* | *F* | *G* | *H* |
| *I* | *J* | *K* | *L* |
| *M* | *N* | *O* | *P* |
| *Q* | *R* | *S* | *T* |
| *U* | *V* | *W* | *X* |

Fig. 6(i)

| | | | |
|---|---|---|---|
| *A* | *B* | *C* | *D* |
| *E* | *F* | *G* | *H* |
| *I* | *J* | *K* | *L* |
| *M* | *N* | *O* | *P* |
| *Q* | *R* | *S* | *T* |
| *U* | *V* | *W* | *X* |

Fig. 6(j)

| | | | |
|---|---|---|---|
| *X* | *W* | *V* | *U* |
| *T* | *S* | *R* | *Q* |
| *P* | *O* | *N* | *M* |
| *L* | *K* | *J* | *I* |
| *H* | *G* | *F* | *E* |
| *D* | *C* | *B* | *A* |

*180° Rotation*

METHOD OF PRINTING IMAGE INFORMATION HAVING A SPECIFIC ORIENTATION

Matter enclosed in heavy brackets [ ] appears in the original patent but forms no part of this reissue specification; matter printed in italics indicates the additions made by reissue.

BACKGROUND OF THE INVENTION

1. Technical Field of the Invention

The invention relates to an apparatus and method for printing image information having a specific orientation on sheets of a receiving material. More particularly, this invention relates to a method and apparatus for printing two images on a receiving material with a printer which rotates at least one of the images with a rotation method that utilizes minimal memory space to rotate images. The invention also relates to a method and apparatus for rotating a series of images to position pairs of images from the image series in a specific orientation on a corresponding series of receiving materials.

2. Description of Related Art

In general, printing two images having an identical orientation on a single sheet is known. For example, U.S. Pat. No. 4,763,167 describes a copying method in which the image information from two different original sheets is read or scanned successively and, after storage and processing, is printed on one copy sheet such that the reading orientations of the two images are identical and are perpendicular to the long side of the copy sheet. With this conventional method, it is possible to obtain copy sheets which may be folded in the middle, between the images, in order to form a folded sheet as shown in the '167 patent. A plurality of such copy sheets may be assembled to create a manual or booklet.

According to another known method of reproduction, original images are printed twice on one copy sheet and then the copy sheet is cut through between the two (identical) images, thus giving one page for each of two booklets, e.g. manuals, to be produced.

Alternatively, instead of a booklet with a fold line, spine, or some other binding portion *i.e. a part of the sheet suitable for binding a plurality of such sheets into a collection,* at the center of the sheet, it is possible to utilize a binding portion provided at the left-hand or right-hand (short side) of the copy sheets. To print on sheets provided with such alternative binding portions, two images are typically read out of an image or page memory with a 0° or 180° rotation and then printed on the sheet accordingly.

Increasingly, when images from original sheets are reproduced, copy sheets which may or may not be completely adapted to the method of subsequent collation, *e.g. collation by way of ring binding, thread sewing, screw binding, stapling, clipping, gluing, thermo-binding etc.,* are being used for example, copy sheets provided with a binding portion on two short sides [such as] *including* suitable for storage in a ring binder are often used to reproduce images. Such copy sheets, which may or may not be connected in continuous form, are typically cut in half at a perforation leaving two half-sheets each of which includes a binding portion on a short side thereof. If the above-described conventional methods of reproduction are used with such copy sheets, identical pages would be obtained after cutting through the sheet, but the perforated edges would be at opposite sides, something which is quite unacceptable.

Furthermore, if two different pages, e.g. two consecutive pages, are imaged on copy sheets provided with a binding portion on two short sides, it would be a complex matter to collate the booklets, because when the copy sheet is cut through the center the pages would have to be arranged alternately.

Also, in conventional duplex printing, the image of the first original is printed on one side of the copy sheet and then the copy sheet is flipped 180° about the short axis and then the image of the second information sheet is printed on the second side of the copy sheet. In this case, action must be taken to keep the image orientation the same on both sides of the copy sheet.

An example of conventional duplex printing is described in Applicants' commonly assigned European Patent Application 0 628 922. According to the method known therefrom, optimal use is made of the memory space by storing the image data of the first original image in ascending address sequence in the memory starting from the first free memory address, but storing the image data of the second original image in reverse address sequence in the memory starting from the last free memory address. On read-out, the image data are always read out of the memory in ascending address sequence, so that the image data of the second original image are fed to the printer with an automatic 180° rotation.

Furthermore, conventional image rotation typically writes the data of an image line-by-line into a bit map memory and then reads out the data column-by-column (from bottom to top) from the memory. After the read-out is completed and the memory is empty, the data of the next image to be rotated can then be written into the memory. In other words, before the data of each subsequent image can be written into the memory it is necessary to wait until the read-out of the preceding image is completed.

To remedy the delay caused by this conventional rotation method, it is known to utilize two memories which are used alternately: while one image is being read out of the first memory, the next image is being written into the second memory. However, this conventional remedy increases the cost and complexity of the resultant system.

Furthermore, it should be noted that a method of writing image data from an image within a series of images into a memory at memory locations that have been freed by reading out the preceding image in the series is described in U.S. Pat. No. 5,151,976. The '976 patent writes an image into a memory line-by-line and then reads-out this image in a fixed, sawtooth pattern to rotate the image through 90° plus a reflection. Because of the limitations on the rotation angle, the fixed, sawtooth addressing formula described in the '976 patent is therefore not suitable rotating images as intended by the present invention, nor is it suitable for changing the angle of rotation for each image optionally in a series of images.

SUMMARY OF THE INVENTION

A main object of the invention is to provide improvements in which address the above problems. To this end, the present invention includes a method and apparatus which prints two images on a receiving material such that the two images are situated next to one another with reading orientations of the images rotated through 180° relative to one another and forming a right angle with the sides of the receiving material which are provided with a binding portion.

By utilizing this aspect of the invention, the image orientation with respect to the associated short side of the copy sheet will be the same for both images. If two different originals are copied on one copy sheet, two identically oriented consecutive pages will be obtained which may be easily collated into into a single booklet. Due to efficiency considerations, however, it is sometimes preferably to image a single original image twice on the copy sheet, and according to the invention this will result in two identically oriented pages which may be easily collated into two [, consecutively made] booklets.

The method and apparatus according to the invention can be applied to any printer, irrespective of the formats of the original sheet, on the one hand, and the copy sheet, on the other hand. Thus it is possible to use one A4 original sheet read into the copying machine in the plait position, and an A4 copy sheet which is delivered by the printer in the portrait position, in which case the original image rotation should take place through +90° and −90° respectively, with a reduction of 71%. A landscape sheet can also be used, the image of which may be reproduced twice on a copy sheet that is delivered in the portrait position, in which case rotation will be through 180° for one of the images.

For the method and apparatus of the invention, there is no need to start with original sheets scanned by a scanner and with the resulting data then processed. It is possible to generate the image data page-wise with a computer using a suitable program and then rotate and print the generated image data using the inventive methods. In this application, the term "original sheet" also refers to an image generated by a computer.

According to another aspect of the present invention, an attractive manner of rotating the image data is applied, using just one memory having a capacity which is only slightly larger than that required to contain the image data. According to this aspect, the invention offers a rotation procedure for blocks of image information each corresponding to an original image from a series of at least two original images, using a memory with locations corresponding to a matrix of image elements, or blocks of image elements, of an original image, hereinafter referred to as "image data."

The inventive rotation procedure includes writing image data into the memory according to a first sequence of memory locations and reading out of the memory the written-in image data according to a second sequence of memory locations, wherein the writing into the memory of image data from the series is affected in substantially the same sequence as that in which image data of a preceding image in the series was read out. Furthermore, at the start of a series of images, the image data are written into consecutive memory locations.

Still further, the inventive method is such that for a change of orientation in the form of a rotation through an angle of {0°,+90°, +180°, −90°} image data are read out of memory locations of the memory in a sequence given by an address sequence series which is built up from series elements each designating a memory location of the memory in which an image element or a block of image elements of the first matrix is stored. The series elements may be calculated by the following equation:

$$\text{series element}(i_j) = \left(i * \prod_{k=1}^{j} x_k\right) \text{modulo}(d_1 * d_2 + 1) - 1 \quad (1)$$

where i=position within the address sequence series, where $1 \leqq i \leqq d_1 * d_2$, j=serial number of the relevant image in the series, $d_1$=number of columns of the matrix, $d_2$=number of rows of the matrix, $X_k$=parameter related to the required angle of rotation for the $k^{th}$ image in the series of images, where $X_k$=1 for a rotation through 0°, $-d_1$ for a rotation through +90°.

−1 for a rotation through +180°, and $d_1$ for a rotation through −90°.

The image data of an image from the series are simultaneously written into the memory while the image data of the preceding image of the series are being read out, either by writing new data directly onto a location that has just become free (or by writing onto a location according to a lag-time of a variable number of memory locations) Significantly, the writing operations are performed according to the same sequence of memory locations that were used to read out the preceding image in the series.

By overwriting the memory in this way, it is no longer possible to obtain a fixed relationship between the positions of the image data in the image matrix and the positions of the memory locations in the memory. This problem can be solved with good memory address management, but management in the form of a table with addresses takes up valuable memory space so that some of the gains in memory size reduction are lost. Instead of such complex memory management utilizing a table, the above addressing formula (1) is applied by the invention. This inventive procedure requires only minimal memory space and processor capacity.

Addressing formula (1) is not only suitable for rotating individual pixels but also for rotating blocks of pixels. In fact, very fast conventional hardware circuits which can rotate square blocks of pixels (e.g. 8×8) through angles of 90° and multiples thereof may be used in conjunction with the invention. When these conventional circuits are used with the invention, the image matrix is divided into blocks of pixels and the blocks are written into and read out of the memory as a unit with inventive addressing formula (1) indicating the positions of the blocks in the memory.

By employing the inventive addressing formula, it is always possible to find the correct address sequence series for writing an image into the memory following a read-out of a preceding image. By simply adjusting of the value of $x_k$, the invention also permits each image in the series to be rotated through a different rotation angle because addressing formula (1) determines the correct addresses for each of the desired rotations.

The rotation method according to the invention can also be applied to making duplex copies. In the inventive method and apparatus for making duplex copies, the original images are read consecutively into the memory and the read-out of images from the memory takes place consecutively after each write-in accordance with an address sequence given by the address sequence series whose elements are defined by formula (1), wherein the selected angles of rotation differ by 180° relative to one another and wherein the data of the two read-out operations are fed successively to the printer for consecutive imaging on one side and then the other side of a copy sheet, respectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIGS. 4(a)–4(j) illustrates a matrices for writing-in and reading-out image data according to the invention in the case of 90° rotation;

FIGS. 5(a)–(j) illustrate matrices for writing-in and reading-out image data according to the invention in the case of −90° rotation; and FIGS. 6(a)–(j) illustrate matrices for writing-in and reading-out image data according to the invention in the case of +180° rotation.

DETAILED DESCRIPTION OF PREFERRED EMBODIMENTS

Figure 1:
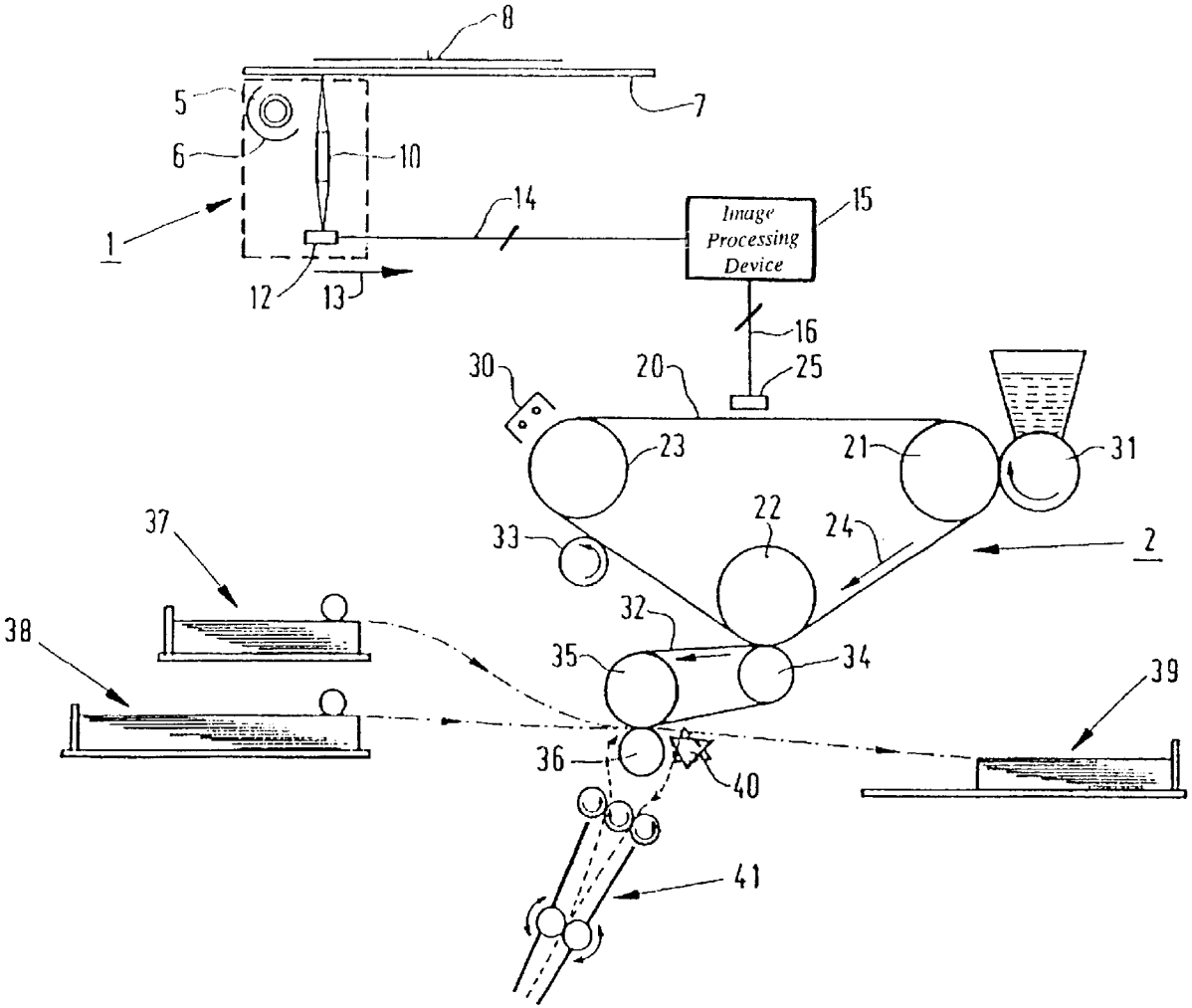
FIG. 1 is a diagram showing a copying device applying the method according to the invention.

The copying apparatus shown in FIG. 1 includes a scanner 1 and a printer 2. The scanner 1 is provided with a tubular lamp 5, a reflector co-operating therewith for illuminating a narrow strip of an information sheet or document 8 placed on a platen glass 7, and an array of imaging glass fibers (e.g. a "Selfoc lens array") which projects the light that is reflected by the document on a sensor array such as CCD array 12.

Because the scanner 1 is advanced at uniform speed in the direction of arrow 13 by a known driver (not shown), the document 8 is scanned line-wise by the CCD array 12. Thus, each image dot on the document is converted to an analogue signal corresponding to the grey value of the image dot. The analogue signal is then converted to a digital signal, such as an 8-bit digital signal for each image dot, by an A/D converter (not shown).

Thereafter, the digital signals (image data) are fed via a number of parallel lines of data bus 14 to an image processing device 15 in which the image data may be subjected to one or more image processing operations (e.g. thresholding, dithering, enlarging, reduction, rotation etc) and may be stored, usually in compressed form, in a working memory 52. The stored image data are then fed, after any necessary decompression in decompression device 56, to the printer 2 via data bus 16.

As known in the art, the printer 2 is provided with an endless photoconductive belt 20 which is advanced in the direction of arrow 24 at a uniform speed by drive and guide rollers 21, 22 and 23, respectively. An LED array 25 is actuated by the processed image data received from the data bus 16 such that the photoconductive belt 20, after being electrostatically charged by a corona device 30, is exposed line-by-line image-wise.

The latent charge image formed on the photoconductive belt 20 as a result of the exposure is developed with toner powder by a magnetic brush device 31 to form the toner image which is then brought into contact and under pressure with an endless intermediate medium belt 32 in a first transfer zone. The intermediate medium belt 32 is made of or covered with an elastic and heat-resistant material (e.g. silicone rubber) to aid in this transfer.

Under these conditions, the toner image is transferred by adhesion from the photoconductive belt 20 to the intermediate medium belt 32. After this image transfer, any remaining toner powder residues are removed from the photoconductive belt 20 by a cleaning device 33, whereupon the photoconductive belt 20 is ready for re-use.

The intermediate medium belt 32 is trained over drive and guide rollers 34, 35. Furthermore, the intermediate medium belt 32 is heated to a temperature above the softening temperature of the toner powder, e.g. by an infrared radiator disposed inside roller 35. While intermediate medium belt 32 with the toner image thereon is advanced, the toner image becomes tacky as a result of this heating. In a second transfer zone between the intermediate medium belt 32 and a pressure roller 36, the tacky toner image is transferred by pressure and simultaneously fixed on a copy sheet fed from one of the reservoirs or feed trays 37 or 38. The resulting copy can then be deposited in a collecting tray 39.

In the case of duplex copies, i.e. copies with an image on both sides, the copy sheets are fed to a turn-over device 41 by a deflecting element 40 (placed in the position shown in broken lines), after one side of the sheet has been printed Each copy sheet is turned over in the turn-over device 41, whereupon it is then fed back to the second transfer zone between the belt 32 and the pressure roller 36, where it is printed on the other side with a powder image and then deposited in the collecting tray 39.

FIG. 1 shows only two copy sheet reservoirs 37 and 38. but the number of reservoirs can be increased to enable all conventional copy sheet formats (eg., A5, A4, A3 or American formats) to be fed to the printer 2. The reservoirs 37, 38 can also be disposed to enable the various copy sheet formats to be fed in different orientations such as the landscape orientation having the longer side of the copy sheet in the direction of transit and the portrait orientation having the shorter side of the copy sheet in the direction of transit. Furthermore, the copy sheet orientation may depend on the arrangement of the original on the platen glass 7.

Figure 3:
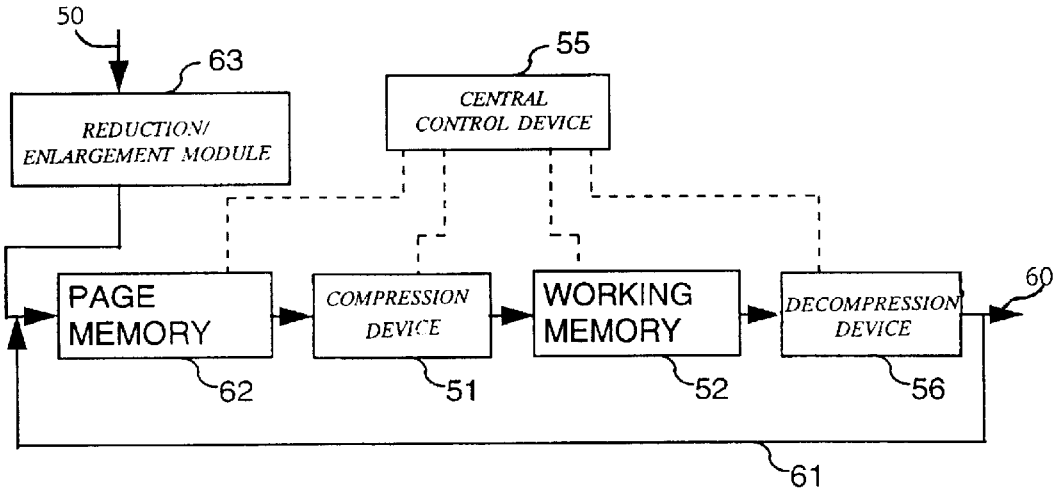
FIG. 3 diagrammatically illustrates part of a copying device for performing a method according to the invention.

FIG. 3 diagrammatically illustrates an example of a relevant part of the image processing device 15. The digital signals representing each image pixel are fed successively via a data bus 50 to an enlargement/reduction module 63, a page memory 62, and a compression device 51. The compression device 51 is optionally employed to compress image data in a manner known in the art.

The compressed image data are then stored in a working memory 52, in which the image data of all the documents required for a specific copy job are stored line-by-line. The compressed image data are then read out of the working memory 52, the image data being fed line-by-line to a decompression device 56 for decompression in a known manner. The decompressed image data may then be fed line-by-line via a data bus 60 to other known image processing devices and finally sent to the LED array 25 of the printer 2 via data bus 16.

The central control device 55 actuates the various above-mentioned devices and process functions of the printer 2 and image processing device 15. A portion of the image processing device 15 is shown in FIG. 3. The page memory 62 shown in FIG. 3 is controlled by the central control device 55 in accordance with the invention to rotate images. Alternatively, the page memory 62 could also be accommodated after the decompression device 56 in the direction of the process.

Figure 2:
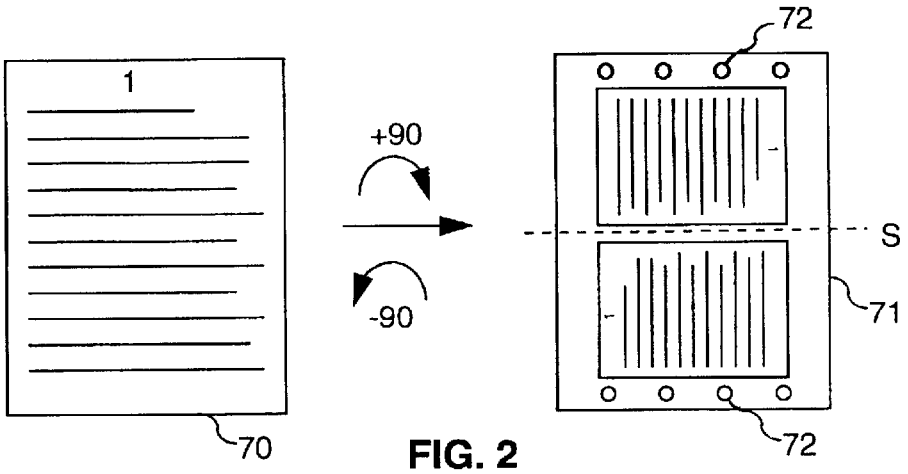
FIG. 2 shows the rotation of images in making copy sheets for booklets, according to the invention.

When the method according to the invention is applied, original images, possibly after reduction in reduction/ enlargement module 63 (depending on the formats selected for the original and print), are printed next to one another on a copy sheet 71 having *binding portions 72 including* perforations or other types of binding [portions] *arrangements* [72] on two opposite sides of the copy sheet 71 as shown in FIG. 2. This printing is conducted such that the reading orientations of the two images are rotated through 180° relative to one another and such that the reading orientations form a right angle with respective sides of the copy sheet 71 that are provided with the binding portions 72.

As mentioned above, this printing arrangement is shown in FIG. 2. More particularly, FIG. 2 illustrates the case in which an original sheet 70 is imaged twice on a copy sheet 71, both short sides of which are provided with binding portions 72 such as rows of ring binder holes for constructing two identical booklets.

Furthermore, two different images may be printed on copy sheet 71 and may be accommodated in a booklet in the form of two, e.g. successive, pages. In this alternative, the images in the right-hand part of FIG. 2 differ but their relative orientation is the same as the case referred to previously.

It will be apparent from FIG. 2 that of the two images for printing on a copy sheet 71 the first image is rotated through −90° and the second image is rotated through +90°. When the printing is completed, the copy sheet 71 is then cut between the two images as indicated by dotted line S. The resulting half-sheets can then be collected at the perforations to form a booklet or manual. With this printing arrangement and subsequent cutting and collection, all the printed images are then in the correct orientation.

It is possible that only after a number of documents have been scanned by the scanner 1 and the image data have been stored in the working memory 52 that the image data for one or more documents are found to require rotation. In that case, the relevant image data are called up from the working memory 52 and re-fed to the page memory 62 via the data bus 61. In this way, the desired rotation can be performed by writing the image data into and then reading the image data out of the page memory 62 according to the addressing formula (1).

If the original images are to be printed on a copy sheet 71 having the same size as one of the original images, these original images must first be reduced in size. Furthermore, to print an A3 original on an A4 receiving sheet, the A3 original is reduced 71% electronically in reduction/enlargement module 63. This percentage is obtained by dividing the physical dimensions of an A4 sheet and an A3 sheet (201/297). With such reduction, the white margin along the text on the original is also reduced. In this example, a white margin of 10 mm then becomes 7.1 mm.

For some applications, it is desirable to keep this margin constant. Otherwise, the text would be printed too close to the binding portion 72. To keep the margin constant, the physical dimensions of the paper formats are not divided into one another to generate the reduction percentage. Instead, these formats are reduced with the required margin. On the basis of an A3 sheet having a 20 mm margin on both sides, if it is required to obtain a print also having a margin of 20 mm, a 66% reduction is applied ((210−40)/(297−40)=66%).

The printer 2 may also be provided with a selector to enable a choice to be made between the two reducing options described above. Such a selector is particularly useful in the case of automatic reduction and/or enlargement by reduction/enlargement module 63.

The literature describes numerous methods of rotating image data through 90° or multiples thereof in a memory. In principle, these convention techniques can be applied to the apparatus of the invention. In practice, however, the invention provides a better method than the conventional techniques because the invention combines minimum memory occupation with high processing speed. Furthermore, the image rotations techniques disclosed herein are particularly well suited to printing a series of images such as the series of images found in a booklet constructed with copy sheets 71 having the format shown in FIG. 2.

According to the inventive image rotation method, the image data of an image from a series of images each of which is to be subjected to rotation are written into the page memory 62 while the image data of the preceding image from the series are read out. In other words, the current image is written into the page memory substantially simultaneously with the read-out of the preceding images.

This rotation procedure may be performed either by writing new data directly on a location that has just become free or by writing new data on a location which has become free several read-out cycles ago. In either case, the current data is written into the page memory 62 in the same sequence of memory locations that the previous image data was read out. This sequencing permits substantially simultaneous read-out and write-in and results in minimal memory storage requirements for the page memory 62.

The image data of the first image of a series of images to be rotated is written line-by-line according to the lines of the image matrix from the top left to the bottom right according to successive addresses of the page memory 62 as shown in FIG. 4(a). In other words. FIG. 4(a) illustrates the initial read-in sequence of the first image of a series of images to be rotated. FIG. 4(a) also illustrates the positions of the memory locations in page memory 62.

It will be apparent that by writing new image data in the sequence of memory locations in which the preceding image was read-out there is no fixed relationship between the positions of the image data in the image matrix and the positions of the memory locations in the page memory 62. Consequently, the central control device 55 calculates an address sequence series which always indicates the correct memory locations at which the required image data can be found for read-out and write-in.

The address sequence series is given by the following formula:

$$\text{series element}(i_j) = \left(i * \prod_{k=1}^{j} x_k\right) \text{modulo}(d_1 * d_2 + 1) - 1 \tag{1}$$

where i=position within the address sequence series, where $1 \leqq i \leqq d_1 * d_2$, j=serial number of the relevant image in the series, $d_1$=number of columns of the image matrix, $d_2$=number of rows of the image matrix.

$x_k$=parameter related to the required angle of rotation for the $k^{th}$ image in the series of images, where $x_k$=1 for a rotation through 0°, −d, for a rotation through 90°, −1 for a rotation through 180°, and $d_1$ for a rotation through −90°.

As described, this formula always gives the correct location sequence for a series of consecutive rotation operations. The product series π does not always have to be developed in this connection. Formula (1) can in fact also be written in iterative form as follows:

series element $(i_j)=(i_j * M_j)$ modulo $(d_1 * d_2+1)-1$ where $M_j=(M_{j-3} * x_j)$ modulo $(d_1 * d_2 1)$ and $M_0=1$ If the factor M is always stored in the memory, it can be used in the next operation by multiplying it by the factor x for the next operation.

This formula is not only suitable for rotating single pixels but also for rotating blocks of pixels. Very fast hardware circuits are known in the art which can rotate square blocks of pixels (e.g. 8*8) pixels through angles of 90° and multiples thereof. When such circuits used with the invention, the image matrix is divided into blocks and the blocks are moved as a whole, formula (1) indicating the positions of the blocks in the memory.

It should be noted that when $x_k=1$ (rotation through 0°), the page memory 62 acts as an ordinary buffer.

The image rotation procedure will now be further explained by reference to the following examples.

FIGS. 4(a)–(j), 5(a)–(j) and 6(a)–(j) give a number of sequences in a matrix arrangement, according to which rotation is respectively performed through +90, −90 and +180°. For each these examples $d_1=4$ and $d_2=6$ because the image matrix has 4 columns and 6 rows.

FIGS. 4(a), 5(a) and 6(a) show a matrix indicating the sequence in which the image elements of the first image are written into the page memory 62. FIGS. 4(a), 5(a) and 6(a) also show the memory locations for the image matrix. Beneath each of the matrices shown in FIGS. 4(a), 5(a) and 6(a), matrices for three consecutive images in a series of images are illustrated: eg. FIGS. 4(b), (e) and (h) show three consecutive images to be rotated by the invention.

Furthermore, FIGS. 4(c), (f) and (i) show matrices indicating the sequence of writing the image data from FIGS. 4(b), (e) and (h), respectively into the page memory 62. Still further, FIGS. 4(d), (g) and (h) show the read-out result by reading-out the matrices from FIGS. 4(c), (f) and (i), respectively.

More particularly, on the left of the FIG. 4 series, matrices 4(c), 4(f) and 4(i) show the sequence in which consecutive images in a series of images (FIGS. 4(b), (e) and (h)) are written into page memory 62 wherein consecutive alphabetical letters indicate the sequence order. Furthermore, FIGS. 4(d), 4(g) and 4(j) show the rotated image which results by reading-out the FIG. 4(c), 4(f) and 4(i) matrices, respectively.

In other words, the FIG. 4(b) image is read into page memory 62 to produce the matrix shown in FIG. 4(c); the FIG. 4(c) matrix is rotated by the invention to produce image 4(d). Furthermore, the FIG. 4(e) image is read into page memory 62 to produce the matrix shown in FIG. 4(f); the FIG. 4(f) matrix is rotated by the invention to produce image 4(g). A similar series of matrices are shown in the FIG. 5 series and the FIG. 6 series.

To distinguish each of these matrices, capital letters and lower case letters, and italicized letters are used and indicate that the image data relate to consecutive original images within a series of images. More particularly, the capital letters in FIGS. 4(b)–(d) designate the first image, the lower case letters in FIGS. 4(e)–(g) designate the second image, and the italicized letters in FIGS. 4(h)–(j) designate the third image. The FIG. 5 series and the FIG. 6 series also employ the same lettering scheme used in the FIG. 4 series to distinguish the various matrices.

The write-in and read-out sequences for each image is constructed by central control device 55 by applying addressing formula (1). In the case of rotation through +90°, $x_k=-d_1$ is utilized in formula (1). In the case of rotation through −90°, the formula applies with $x_k=+d_1$. In the case of rotation through 180°, the same formula applies with $x_k=-1$. In each of these cases, the central control device 65 determines the address sequence for the read-out and write-in from and to page memory 62.

FIGS. 4(b)–(d) illustrate an example of a rotation through +90°. FIG. 4(b) shows the original first image matrix. This first image is written into the page memory 62 at locations in accordance with the matrix shown in FIG. 4(a) to produce the write-in matrix shown in FIG. 4(c). In other words, the first image is written into consecutive locations in the page memory 62 wherein the consecutive memory locations are shown by the numerical sequence in FIG. 4(a) and the resulting alphabetical sequence shown in FIG. 4(c).

The first image data are then read-out from the page memory 62 in accordance with the address sequence 20, 16, 12, 8, 4, 0, 21, 17, 13, 9, 5, 1, 22, 18, 14, 10, 6, 2, 23, 19, 15, 11, 7, 3 which is generated by central control device 55 according to addressing formula (1). The result of this read-out is shown in FIG. 4(d), i.e., U, Q, M, I, E, A, V, R, N, J, etc., and it can be seen that the image of the original FIG. 4(b) matrix is turned through 90°.

As this read-out is performed, the write-in of the next image in the series is simultaneously performed. More particularly, the first image data "a" of the second image (the second image is shown in FIG. 4(e)) are written into page memory 62 at the first free location 20. This operation is followed by writing b, c, d, e, f, g, h, etc. into locations 16, 12, 8, 4, 0, 21, 17, etc. This write-in sequence order is also shown by the alphabetical order in FIG. 4(f).

To read-out this FIG. 4(f) image from page memory 62 to perform the next rotation, however, the following address sequence is used: 15, 6, 22, 13, 4, 20, 11, 2, 18, 9, 0, 16, 7, 23, 14, 5, 21, 12, 3, 19, 10, 8, so that the rotated image matrix obtained is shown in FIG. 4(g). In other words, FIG. 4(g) is a matrix corresponding to the original FIG. 4(e) image rotated through 90°.

On the next write-in, the first image data "A" of the third image (FIG. 4(h)) are written in at the first free location "u". This gives the write-in matrix shown in FIG. 4(i). The write-in matrix of FIG. 4(i) is then read-out in the following address sequence: 10, 21, 7, 18, 4, 15, 1, 12, 23, 9, 20, 6, 17, 3, 14, 0, 11, 22, 8, 19, 5, 16, 2, 13, to generate the rotated image matrix shown in FIG. 4(j).

The procedure is also performed in a corresponding manner for rotating images through −90° and through 180° as illustrated by FIGS. 5(a)–(j) and 6(a)–(j), respectively.

More specifically, FIGS. 5(a)–(j) illustrate a −90° rotation as follows. As mentioned above, FIG. 5(a) shows the memory locations of page memory 62. The first image of the series (FIG. 5(b)) is written into consecutive memory locations in the page memory 62 to produce the matrix shown in FIG. 5(c).

The image data in the FIG. 5(c) matrix are then read out from the page memory 62 under the control of the central control device 55 in accordance with the following address sequence series to perform a −90° rotation: 3, 7, 11, 15, 19, 23, 2, 6, 10, 14, 18, 22, 1, 5, 9, 13, 17, 21, 0, 4, 8, 12, 16, 20. In other words, the data (D, H, L, P T, X, C, G, K, O, S, W, B, F, J, N, R, V, A, E, I, M, Q, U) from the FIG. 5(c) matrix are read-out from page memory 62 in the order specified by addressing formula (1) to construct the rotated image shown in FIG. 5(d).

As this read-out is performed, the write-in of the next image in the series is simultaneously performed. More particularly, the first image data "a" from the second (FIG. 5(e)) image are written into page memory 62 at the first free location "3". This operation is followed by writing b, c, d, e, f, g, h, etc. into locations 7, 11, 15, 19, 23, 2, 6, etc to generate the FIG. 5(f) matrix.

The above operations are repeated to read-out the FIG. 5(f) matrix in an order specified by the address formula (1) to generate the rotated image in FIG. 5(g). Similarly, the third image (FIG. 5(h) is read-into the page memory 62 and results in the matrix shown in FIG. 5(i) which, in turn, is read-out of page memory 62 to generate the rotated image shown in FIG. 5(j).

FIGS. 6(a)–(j) illustrate 180° rotation in a manner corresponding to the detailed description above for FIGS. 4(a)–(j), and 5(a)–(j). More particularly, the address sequence series for reading the FIG. 6(c) matrix out to generate the FIG. 6(d) 180° rotated image is: 23, 22, 21, 20, 19, 18, 17, 16, 15, 14, 13, 12, 11, 10, 9, 8, 7, 6, 5, 4, 3, 2, 1. As mentioned above, this same address sequence series is also utilized to substantially simultaneously read-in the second image (FIG. 6(e)) into the page memory 62 with the result shown in FIG. 6(f).

Furthermore, FIG. 6(g) shows the 180° rotated image generated from the FIG. 6(f) matrix by reading-out the matrix according to addressing formula (1). Also, FIGS. 6(i) and (j) respectively show the matrix for the read-in third image and the read-out, 180° rotated third image.

The above-described method of rotating images can be used without being restricted if the images to be printed next to one another on a receiving sheet differ from one another. Each image of the series of originals to be printed must then be rotated through 90°, alternately in the counterclockwise direction (−90°) and in the clockwise direction (90°). Addressing formula (1) then always gives the correct read-out/write-in sequence even though each image in the series is rotated by a different amount.

If the images for printing on a receiving sheet are identical (i.e. for making two identical booklets) an image written once into page memory 62 is read out twice, in accordance with patterns in which the same address sequence series is followed in two ways, corresponding to +90° and −90°. On the second read-out the image data of the next image is written into the read-out memory locations within page memory 62, whereafter the address sequence series is adjusted to this second read-out.

It will be clear that the system shown in FIG. 3 can also be used for duplex printing. In that case, the page memory 62 will be actuated for each second image in order to rotate it through 180°, in accordance with the sequence shown in FIG. 6(a)–(j). The writing into the working memory 52 thereof then takes place after writing into the working memory 52 of the first image for printing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of printing image information on a receiving material, two opposite sides of which are individually provided with a binding portion for binding a plurality of the receiving materials into a collection, comprising the steps of:

printing a first image on the receiving material;

rotating a second image relative to the first image such that a reading orientation of the second image is rotated 180° relative to a reading orientation of the first image;

printing the rotated second image next to the first image on the receiving material such that the reading orientations of the first image and the rotated second image form right angles with respective sides of the receiving material that are provided with the binding portion.

2. The method according to claim 1, wherein the first image is identical to the second image.

3. The method according to claim 1, wherein each of the binding portions includes a plurality of holes.

4. The method according to claim 1, wherein the image information for printing includes a series of at least two images beginning with the first image, said rotating step utilizing a memory having memory locations corresponding to a matrix of image elements, said rotating step including the substeps of:

writing the first image into memory locations in the memory according to a first sequence of memory locations, wherein the first sequence of memory locations is a consecutive sequence of memory locations;

reading the first image out of the memory according to a second sequence of memory locations;

writing the second image into memory locations in the memory according to the second sequence of memory locations utilized in said step of reading the first image; and reading the second image out of the memory according to a third sequence of memory locations, wherein said step of reading the first image and said step of writing the second image are performed substantially simultaneously.

5. The method according to claim 4, wherein the first and second images are written consecutively into the memory by said writing steps and the read-out of the memory by said reading steps after each write-in takes place successively in accordance with the sequences of memory locations given by a formula, selected angles of rotation differing from one another by 180°, and wherein the data of the two read-outs are fed successively to the printer for imaging on the same receiving material by said printing steps.

6. The method according to claim 1, wherein the image information for printing includes a series of at least two images beginning with the first image, said rotating step utilizing a memory having memory locations corresponding to a matrix of image elements, said rotating step including the substeps of:

writing image data into the memory in a first sequence of memory locations and reading out of the memory the written-in image data in a second sequence of memory locations, wherein the writing into the memory of image data of a certain image from the series is effected in substantially the same sequence as that in which image data of an image directly preceding the said certain image in the said series were read out, wherein at a start of the series of images the first image data are written into consecutive memory locations, and wherein for rotation through an angle of {0, +90, +180, −90} degrees, image data are read out of memory locations of the buffer memory in a sequence given by an address sequence series built up from series elements each relating to a memory location of the memory in which an element or a block of elements of the said matrix is stored, which series elements have a value given by:

$$\text{series element}(i_j) = \left(i * \prod_{k=1}^{j} x_k\right) \text{modulo}(d_1 * d_2 + 1) - 1$$

where i=position within the address sequence series, where $1 \leqq i \leqq d_1 * d_2$, j=serial number of a relevant image in the series, $d_1$=number of columns of the matrix, $d_2$=number of rows of the matrix, $X_k$=parameter related to the required angle of rotation for the $k^{th}$ image in the series, where $x_k$=1 for a rotation through 0°, $-d_1$ for a rotation through 90°, −1 for a rotation through 180°, and $d_1$ for a rotation through −90°.

7. An apparatus for printing image information on a receiving material, two opposite sides of which are individually provided with a binding portion for binding a plurality of the receiving materials into a collection, comprising:

a memory in which the image information is temporarily stored before printing;

a printer receiving a first image from said memory and printing a first image on the receiving material; and an image rotator utilizing said memory to rotate a second image relative to the first image such that a reading orientation of the second image is rotated 180° relative to a reading orientation of the first image, said printer printing the rotated second image next to the first image on the receiving material such that the reading orientations of the first image and the rotated second image form right angles with respective sides of the receiving material that are provided with the binding portion.

8. The apparatus according to claim 7, said image rotator rotating the first image through an angle of −90° and rotating the second image through an angle of 90° by utilizing said memory.

9. The apparatus according to claim 7, said image rotator not rotating the first image and rotating the second image through an angle of 180°.

10. The apparatus according to claim 7, wherein the image information for printing includes a series of at least two images beginning with the first image, said memory having memory locations corresponding to a matrix of image elements, the apparatus further comprising a controller, said controller controlling said rotator to write the first image into memory locations in said memory according to a first sequence of memory locations, wherein the first sequence of memory locations is a consecutive sequence of memory locations;

said controller controlling said rotator to read the first image out of said memory according to a second sequence of memory locations;

said controller controlling said rotator to write the second image into memory locations in said memory according to the second sequence of memory locations;

said controller controlling said rotator to read the second image out of said memory according to a third sequence of memory locations; and said controller controlling said rotator to read the first image and write the second image substantially simultaneously.

11. The apparatus according to claim 7, wherein the image information far printing includes a series of j images beginning with the first image and ending with a $j^{-th}$ image, said rotator rotating images through angles of 0, +90, +180, or −90 degrees, the apparatus further comprising a control unit controlling said rotator to write-in and read-out image data in said memory in such manner that image data of a certain image from the series are written into the memory in substantially a same sequence as that in which image data of an image directly preceding said certain image in the said series were read out, wherein at a start of the series of images the image data are written into consecutive memory locations, and wherein for rotation through an angle of +{0, +90, +180, −90} degrees, image data are read out from memory locations of said memory in a sequence given by an address sequence series built up of series elements each relating to a memory location of said memory in which an element or a block of elements of the said matrix is stored, which series elements have a value given by $$\text{series element}(i_j) = \left(i * \prod_{k=1}^{j} x_k\right) \text{modulo}(d_1 * d_2 + 1) - 1$$

where i=position within the address sequence series, where $1 \leqq i \leqq d_1 * d_2$, j=serial number of a relevant image in the series, $d_1$=number of columns of the matrix.

$d_2$=number of rows of the matrix, $X_k$=parameter related to a required angle of rotation for the $k^{th}$ image in the series, where $X_k$=1 for a rotation through 0°, $-d_1$ for a rotation through 90°, −1 for a rotation through 180°, and $d_1$ for a rotation through −90°.

*12. A method of printing image information, the method comprising:*

*providing a receiving material, two opposite sides of which each having a binding portion for binding a plurality of the receiving materials into a collection; and*

*printing two images on the receiving material, wherein the two images are situated next to one another with reading orientations of the images rotated through 180° relative to one another, and wherein the reading orientations form right angles with the said opposite sides of the receiving material.*

*13. The method according to claim 12, wherein the images are printed simultaneously on the receiving material.*

*14. An apparatus for printing image information on a receiving material, two opposite sides of which are individually provided with a binding portion for binding a plurality of the receiving materials into a collection, the apparatus comprising:*

*a memory in which the image information is temporarily stored before printing;*

*a printer receiving a first image from said memory and printing a first image on the receiving material, the printer also receiving a second image from said memory and printing the second image on the receiving material, the second image being rotated relative to the first image such that a reading orientation of the second image is rotated 180° relative to a reading orientation of the first image,*

*said printer printing the rotated second image next to the first image on the receiving material such that the reading orientations of the first image and the rotated second image form right angles with respective sides of the receiving material that are provided with the binding portion.*

*15. The apparatus according to claim 14, comprising an image rotator, said image rotator rotating the first image through an angle of −90° and rotating the second image through an angle of +90° by utilizing said memory.*

*16. The apparatus according to claim 14, comprising an image rotator said image rotator not rotating the first image and rotating the second image through an angle of 180°.*

* * * * *